(No Model.) 2 Sheets—Sheet 1.
G. M. NEWHALL.
APPARATUS FOR MIXING, HEATING, AND DRYING SUGAR, &c.
No. 321,746. Patented July 7, 1885.
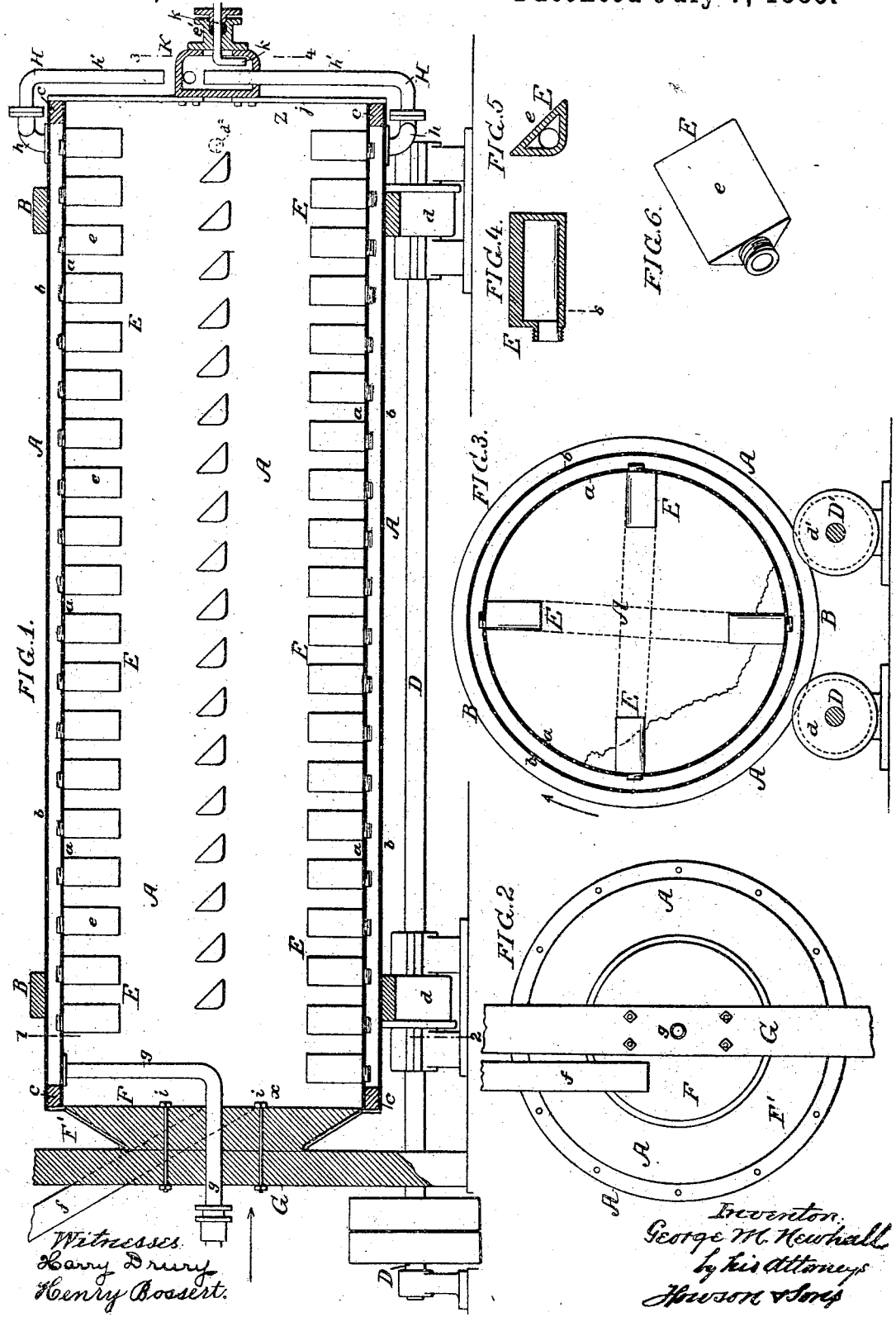
Witnesses
Harry Drury
Henry Bossert.
Inventor:
George M. Newhall
by his Attorneys
Howson & Sons (No Model.) 2 Sheets—Sheet 2.
G. M. NEWHALL.
APPARATUS FOR MIXING, HEATING, AND DRYING SUGAR, &c.
No. 321,746. Patented July 7, 1885.
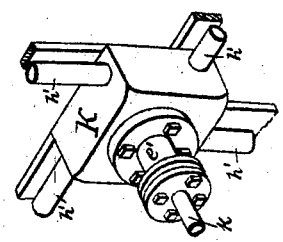
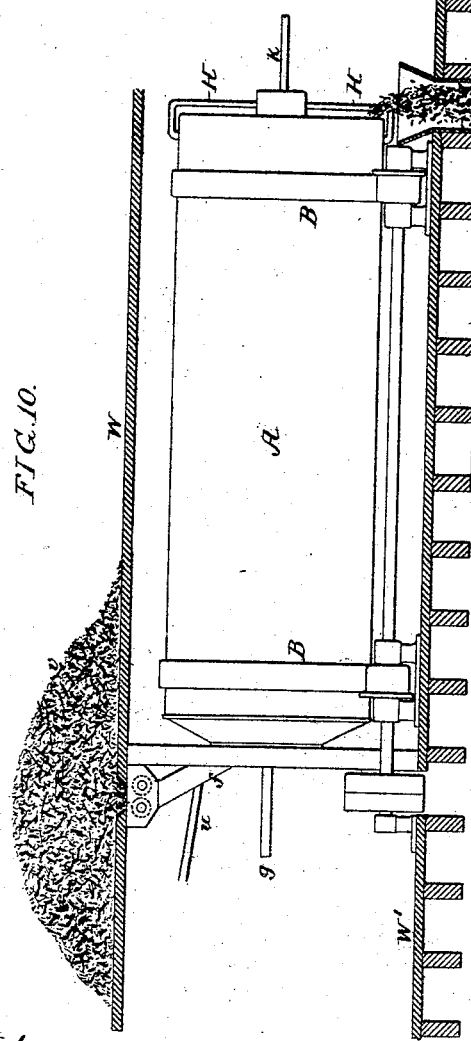
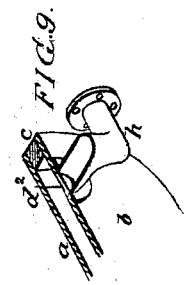
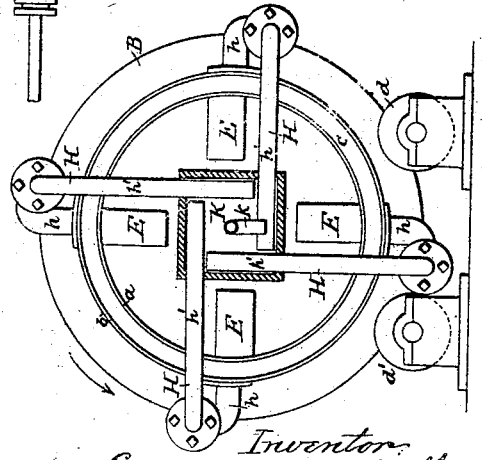
Witnesses:
Harry Drury
Henry Bossert
Inventor:
George M. Newhall
by his Attorneys
Howson & Snyp

UNITED STATES PATENT OFFICE.

GEORGE M. NEWHALL, OF PHILADELPHIA, PENNSYLVANIA.

APPARATUS FOR MIXING, HEATING, AND DRYING SUGAR, &c.

SPECIFICATION forming part of Letters Patent No. 321,746, dated July 7, 1885.

Application filed April 27, 1885. (No model.)

*To all whom it may concern:*

Be it known that I, GEORGE M. NEWHALL, a citizen of the United States, and a resident of Philadelphia, Pennsylvania, have invented certain Improvements in Apparatus for Mixing, Heating, and Drying Sugar and like Materials, of which the following is a specification.

My invention relates to improvements in the construction of apparatus for heating, mixing, or drying sugar or other material, as fully described and claimed hereinafter.

My invention is adapted, especially, for mixing raw sugar or drying the sugar after it has passed through the several steps in the refining process; but is also applicable to mixing or heating various substances, whether wet or dry, for the purpose of obtaining a product of any desired temperature or density.

In the accompanying drawings, Figure 1 is a longitudinal section of my improved apparatus. Fig. 2 is an end view looking in the direction of the arrow, Fig. 1; Fig. 3, a transverse section on the line 1 2, Fig. 1; Figs. 4, 5, and 6, views of one of the blades. Fig. 7 is a transverse section on the line 3 4, Fig. 1. Figs. 8 and 9 are detached views of parts of the apparatus. Fig. 10 is a longitudinal section showing the conveyer combined with apparatus for mixing raw sugar.

A is a drum having two rings, B, secured to its periphery, and mounted on rollers $d\ d'$ on shafts D D', either or both of which are driven so as to rotate the drum A. The drum is preferably horizontal, instead of being inclined, so as to avoid end-thrust on the bearings, and so permit the machine to be run by less power. Attached to the interior of the drum A are a series of inwardly-projecting blades, E, having inclined sides which face the outlet of the drum, so that as the latter is rotated the blades will move the mass along in the drum, and at the same time lift, stir, and agitate the mass. The material to be mixed passes down a chute, $f$, into the conveyer, and as the drum is rotated it does not allow the substance to accumulate in one spot, the tendency of the mass being to creep up the sides of the conveyer as the drum is rotated, Fig. 3, the blades cutting through the material, and the inclined portion of the blades pushing the mass gradually toward the outlet Z.

In mashing sugar before it is "machined," for instance, as described in Tucker's Patent No. 297,095, April 15, 1884, the sugar is caused to travel slowly through the conveyer, the inclined blades cutting through the mass made semi-fluid by water or sirup, and consequently hard to propel. As the blades lift the mass, however, it slides down from the inclined faces of the same, and is brought into the path of a more advanced blade, so that the blades gradually propel the mass toward the exit into another mixer, described hereinafter.

The above description alludes to the conveyer without the steam-jacket and connections and hollow blades, and the conveyer can be used in the form described for mixing a number of substances, dry, semi-fluid, or fluid; but I prefer to use the steam-jacket and the apparatus described below, especially for heating, mixing, or drying sugar and like substances.

In Fig. 1 the drum is composed of an inner cylinder, $a$, and an outer cylinder, $b$, the two cylinders forming, with the end filling-rings, $c\ c$, an inclosed steam-jacket around the entire circumference of the drum. The rings B are secured to the outer cylinder, $b$, and the blades E screwed into the inner cylinder, $a$. These blades are so arranged that they can be adjusted to vary the angle at which their inclined faces are set by screwing them more or less into the drum, and as this angle determines the rate of progression of the material the latter can be fed forward at different speeds at any point desired in the conveyer, and the progress of the material may be retarded at such points as retardation may be advisable. These blades may be of any convenient length, and, if desired, may extend entirely across the drum, as indicated by dotted lines in Fig. 3, in which case their ends can be swaged into the drum; but in all constructions the blades must have the inclined feeding-faces.

Passing centrally through the fixed head F is a supply-pipe, $g$, which within the drum is bent at right angles to connect with the inner cylinder, $a$, and open into the jacket, as shown in Fig. 1. At the opposite end of the jacketed drum are secured to the outer cylinder, b, one or more outlet-pipes, H—four in the present instance—of the construction shown in Figs. 1, 7, and 9. Each of these pipes communicates with a receiving-box, K, which is carried by arms j, Fig. 1, secured to the end of the drum. This box K is provided with a stuffing-box, e', through which passes a stationary pipe, k, for the escape of the water of condensation.

The outlet-pipes H are each composed of a neck or trap, h, with a double bend, and a discharge-pipe, h', leading to the receiving-box K, the bends or traps h being of such a character that as the drum is rotated in the direction of the arrow, Fig. 7, the water of condensation which may have entered the neck when the latter was in the lowest position will tend to flow out through the pipe h', instead of back into the drum, as the said neck is carried upward by the drum in its rotation.

To further prevent the water of condensation which has entered the outlet-pipes H from flowing back into the drum, I provide each outlet-opening with a lip, $d^2$, as illustrated in Fig. 9, and by dotted lines in Fig. 1.

I prefer to close the inlet end x of the drum, with the exception of the passage f, by the head F, secured to any suitable stationary object, G, by bolts l, Figs. 1 and 2. The periphery of the head is beveled, and over the same fits a ring, F', secured to the drum A, the ring fitting snugly around the head, and thus preventing any of the material in the conveyer from backing out over the inlet end. It also affords a steady bearing for the steam-supply pipe g and chute f.

The blades E are preferably made of the triangular form shown, with a comparatively sharp front cutting-edge. They are also made hollow, so that the steam from the jacket will circulate through the blades.

Referring to Fig. 10, I have there shown my improved conveyer used as a mixer and heater for raw sugar. W W' are the floors of a sugar-refinery, v representing the raw sugar, which is fed through the chute f into the conveyer and mixer A, water or sirup being also admitted at u with the sugar.

The rotation of the drum with its interior cutting and feeding blades prevents the sugar from sticking to any portion of the conveyer, as the mash or magma is constantly agitated and moved toward the outlet, from which it passes down a chute into another mixer, S, of a construction similar to that shown in the patent granted to me October 2, 1883, No. 286,056. The bottom of this mixer is provided with a series of valves, T, under which are the centrifugal extractors R.

The great advantage of my improved construction of conveyer is that it prevents the material from remaining in any one spot long enough to burn, scorch, or cake, for it will be observed that, owing to the rotation of the drum, there must be a continual movement of the mass in contact with the inner surface of said drum, so that if any particles had a tendency to stick or adhere to the surface of the drum, they would be at once rubbed off by the friction of other particles in contact therewith. Thus the heating-surface is kept clean and effective.

I claim as my invention—

1. A mixer and conveyer consisting of a horizontal or nearly horizontal revolving drum provided with inwardly-projecting or transverse blades with inclined faces, the said blades being adapted to cut through the material under treatment and feed it forward as the drum revolves, substantially as and for the purpose set forth.

2. A mixer and conveyer consisting of a revolving drum provided with inwardly-projecting blades having inclined faces and adjustable to vary their inclination, substantially as described.

3. A mixer and conveyer consisting of a revolving jacketed drum provided with hollow inwardly-projecting stirring and feeding blades, as specified.

4. The combination of the revolving drum with a fixed filling plate or head, F, in the end thereof, and a chute, f, supported thereby, substantially as described.

5. The combination of the revolving jacketed drum with an outlet-pipe, H, connected to the outer of the two cylinders and communicating with a central escape-pipe in line with the axis of the drum, the said pipe having a bent neck or trap, h, as and for the purpose set forth.

6. The combination of the revolving jacketed drum carrying a series of bent discharge-pipes, H, connected to the outer cylinder of the jacket, and a central receiving-box, K, with an escape-pipe, k, opening into said box, substantially as described.

7. The combination of the revolving jacketed drum having a discharge-pipe, H, connected to the outer cylinder of the drum, and bent as described, and provided with a lip to prevent the return of the water of condensation to the jacket, as set forth.

8. The combination of a heated mixing-conveyer with a heated distributing-conveyer into which said mixing-conveyer discharges, as set forth.

In testimony whereof I have signed my name to this specification in the presence of two subscribing witnesses.

GEORGE M. NEWHALL.

Witnesses:
HENRY BOSSERT,
HARRY SMITH.